United States Patent [19]

Sasaki et al.

[11] 4,244,635

[45] Jan. 13, 1981

[54] GO BOARD USING LIQUID CRYSTAL DISPLAY OR ELECTROCHROMIC DISPLAY

[75] Inventors: Takehiko Sasaki, Yamatokoriyama; Yuji Yashiro, Osaka, both of Japan

[73] Assignee: Sharp Kabushiki Kaisha, Osaka, Japan

[21] Appl. No.: 911,905

[22] Filed: Jun. 2, 1978

[30] Foreign Application Priority Data

Jun. 6, 1977 [JP] Japan .............................. 52/74191[u]

[51] Int. Cl.$^3$ ............................................. G02F 1/133
[52] U.S. Cl. .................................. 350/336; 350/331R; 350/334; 350/357; 273/237
[58] Field of Search ................... 350/331 R, 334, 336, 350/357; 273/237

[56] References Cited

U.S. PATENT DOCUMENTS 4,114,890  9/1978  Yamamoto et al. .................. 273/237

*Primary Examiner*—Edward S. Bauer
*Attorney, Agent, or Firm*—Birch, Stewart, Kolasch and Birch

[57] ABSTRACT

A checkerboard or a "go" board is implemented with a liquid crystal display or an electrochromic display. A pair of a disc pattern electrode and a ring pattern electrode are provided for showing a black "go" stone and a white "go" stone, respectively. A plurality of the disc pattern elecrodes and the ring pattern electrodes are formed on a first transparent glass substrate to serve as segment electrodes. A common electrode is provided opposite to the pair of the disc pattern electrode and the ring pattern electrode. The common electrode is arranged on the opposing second transparent glass substrate. A plurality of checks are printed on, for example, the first transparent glass substrate. The common electrodes, the disc pattern electrodes, and the ring pattern electrodes are activated by a driver coupled to a memory. The memory is adapted to store arrangement information of the black and the white "go" stones, and the blank indication.

5 Claims, 7 Drawing Figures

GO BOARD USING LIQUID CRYSTAL DISPLAY OR ELECTROCHROMIC DISPLAY

BACKGROUND OF THE INVENTION

The present invention relates to a checkerboard and, more particularly, to a checkerboard i.e. "go" board using a liquid crystal display.

Recently, some checkerboards have been investigated, where a plurality of light emitting diodes or small illumination lamps are employed. Each or some of the light emitting diodes or the illumination lamps serve as a "go" stone of the checkerboard. However, it is unavoidably necessary to provide high power to drive those checkerboards because the light emitting diodes and the illumination dissipate high energy.

OBJECTS AND SUMMARY OF THE INVENTION

Accordingly, it is a primary object of the present invention to provide a novel checkerboard or "go" board where only low power dissipation can be expected.

It is another object of the present invention to provide a novel "go" board of a liquid crystal display or an electrochromic display.

It is still another object of the present invention to provide a compact "go" board, suitable for carrying purposes.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to an embodiment of the present invention, a "go" board is formed with a liquid crystal display which shows electro-optical phenomena in either dynamic scattering mode or field effect mode. The liquid crystal display comprises a pair of transparent glass substrates. A plurality of checks are printed on a glass substrate at a predetermined interval. The number of the checks is 19×19 for a board game of "go", for example. The checks cross each other at a right angle. A pair of common electrodes and segment electrodes are provided with corresponding to cross points of the checks for indicating the position of "go" stones when amusing the board game. The common electrodes and the segment electrodes are made of transparent electrodes such as indium oxide.

The segment electrode comprises a disc pattern for showing the arrangement of the black "go" stone. A ring pattern is further included within the segment electrode for indicating the arrangement of the white "go" stone. First lead electrodes are provided for commonly connecting the disc patterns each other which come into line. Each of the ring patterns is provided in such a manner to encircle the disc pattern except for the portion of the first lead electrode therefor. Second lead electrodes are provided for commonly connecting the ring patterns which also come into line. The common electrode is formed on the opposite transparent glass substrate. The common electrodes are arranged so as to be positioned directly across from the disc pattern and the ring pattern, respectively. Third lead electrodes are provided for commonly connecting the common electrodes which come into line. The first and second lead electrodes extend in the X-direction, while the third lead electrodes extend in the Y-direction. The conventional liquid crystal composition is filled between the opposite transparent electrodes to complete a liquid crystal display.

A memory is provided for storing all possible positions of a pair of the common electrodes and the segment electrodes over the "go" board. The memory receives XO, YO, and ZO signals. The XO signal is adapted to determine the position of the "go" stone in the X-direction. On the other hand, the YO signal is adapted to determine the arrangement of the "go" stone in the Y-direction. The ZO signal is adapted to indicate either of the white and black "go" stones and blank position. A driver is coupled to the memory for conducting the first, the second and the third lead electrodes in response to the contents of the memory. Therefore, the black and the white "go" stone indications are effected in a disirable arrangement.

An electrochromic display can be applied to the "go" board of the present invention.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
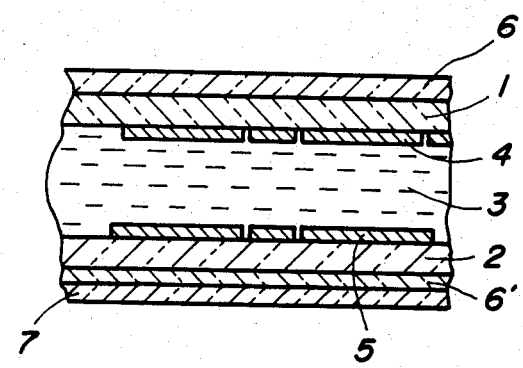
FIG. 1 is a cross-sectional view of a liquid crystal display adapted to a "go" board according to the present invention.

FIG. 1 shows a liquid crystal display adapted to a "go" board of the present invention. Liquid crystal displays of the dynamic scattering mode and field effect mode electro-optic phenomena are both applicable. The dynamic scattering mode electro-optic phenomena is adapted to the liquid crystal display of the present invention in a preferred form as described below.

The liquid crystal display comprises a pair of transparent glass substrates 1 and 2, liquid crystal composition 3 filled therebetween, a transparent segment electrode 4 made of NESA film, for example, disposed on the transparent glass substrate, a common electrode 5 made of NESA film, for example, formed on the opposing glass substrate 2. A pair of polarizers 6 and 6' are disposed on the transparent glass substrates 1 and 2, respectively. A scattering plate 7 is provided on the polarizer 6' for dispersing incident light projected above the polarizer 6 or applied to the scattering plate 7 from the one side thereof. A desirable electric field is applied between the segment electrode 4 and the common electrode 5 to affect the appearance of the liquid crystal composition 3.

Figure 2:
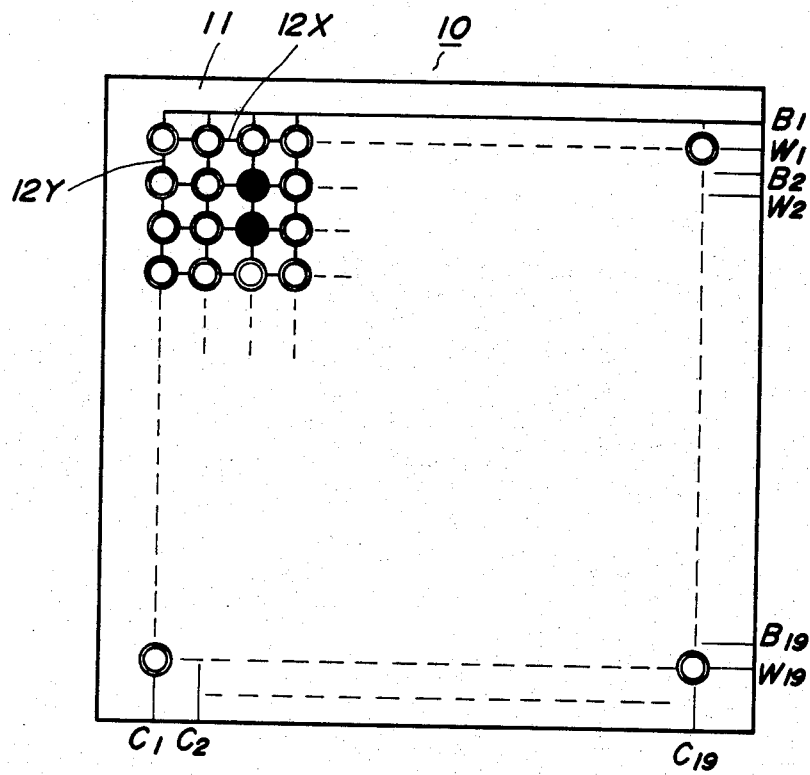
FIG. 2 is a plane view of a "go" board according to the present invention.

Referring now to FIG. 2, a "go" board 10 according to the present invention is shown using the liquid crystal display illustrated in FIG. 1. A transparent glass substrate 11 is related to the transparent glass substrate 1 shown in FIG. 1. A plurality of checks 12X and 12Y etc. are printed on the transparent glass substrate 11 at constant intervals.

A pair including the segment electrode 4 and the common electrode 5 are positioned at respective cross points between the checks 12X and 12Y etc. The number of the checks 12X and 12Y etc. is 19×19 useful for the "go" board, for example. The checks 12X and 12Y cross at a right angle. The checks 12X and 12Y may be formed on the polarizer 6 instead of the transparent glass substrate 11. The segment electrodes 4 are illustrated in a very simple form in the "go" board shown in FIG. 2 for convenience sake only.

Figure 3A:
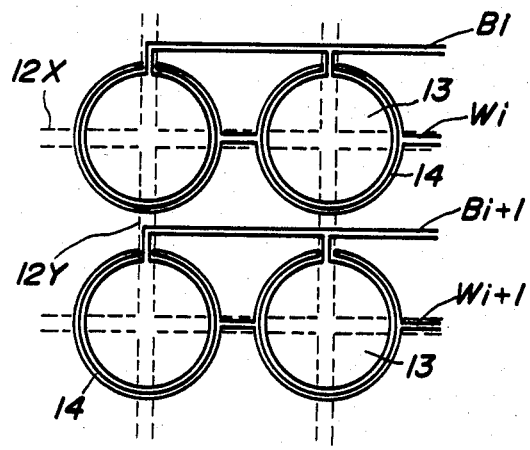
FIG. 3(A) is a plane view of a pair of a disc pattern electrode and a ring pattern electrode, the pair being an element for showing a "go" stone of the "go" board shown in FIG. 2.

Lead electrodes for the segment electrodes 4 and the common electrodes 5 are also omitted from the illustration of the "go" board. FIG. 3(A) shows four elements each comprising a disc pattern electrode 13 and a ring pattern electrode 14 as the segment electrode 4. The disc pattern electrode 13 is conducted for indicating the arrangement of a black "go" stone. The ring pattern electrode 14 is affected, on the other hand, for showing the arrangement of a white "go" stone. When both the disc and the ring pattern electrodes are not conducted, a blank cross point is displayed except for the checks 12X and 12Y etc. The checks 12X and 12Y are illustrated by dotted lines in the drawing of FIG. 3(A). A plurality of a couple of the disc pattern electrode 13 and the ring pattern electrode 14 are positioned corresponding to respective cross points between the checks 12X and 12Y etc. The number of the couple of the disc pattern electrode 13 and the ring pattern electrode 14 is 19×19 suitable for the "go" board.

A first lead electrode Bi is provided for commonly connecting the nineteen disc pattern electrodes 13 in line of the X-direction. That is, the nineteen first lead electrodes B1 through B19 are formed. The ring pattern electrode 14 surrounds the respective disc pattern electrode 13 except for a connection portion for the first lead electrode Bi. A second lead electrode Wi is provided for commonly connecting the nineteen ring pattern electrodes 14 in line of the X-direction. That is, the nineteen second lead electrodes W1 through W19 are formed. The disc pattern electrode 13 and the ring pattern electrodes 14 are isolated each other. The second lead electrode Wi is formed inside of the check 12X to conceal itself.

Figure 3B:
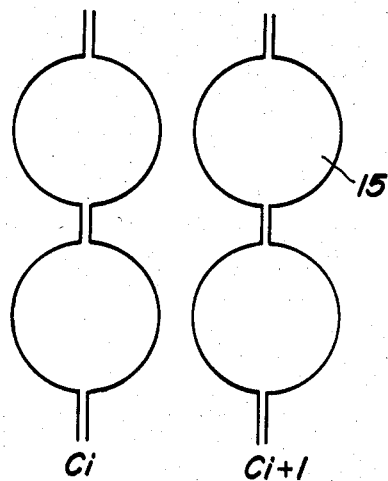
FIG. 3(B) is a plane view of a common electrode of the "go" board shown in FIG. 2.

FIG. 3(B) shows four common electrode 15 formed on the transparent glass substrate 2. The common electrode 15 is opposite to both the disc pattern electrode 13 and the ring pattern electrode 14. A third lead electrode Ci is provided for commonly connecting the nineteen common electrodes 15 in line. The nineteen third lead electrodes C1 through C19 are required.

Figure 4A:
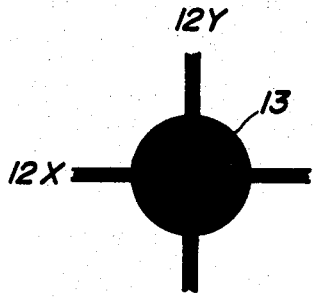
FIGS. 4(A) and 4(B) are plane views of the position of a black "go" stone and a white "go" stone through the use of the disc and the ring pattern electrode, respectively.
Figure 4B:
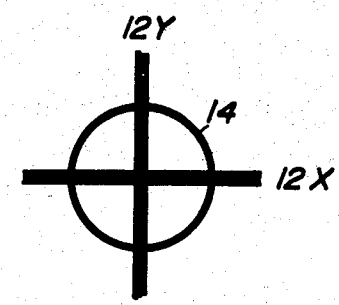

In operation, when the first lead electrode Bi and the third lead electrode Ci are conducted, the disc pattern electrode 13 related to these lead electrodes Bi and Ci is selected. FIG. 4(A) shows the enabling of the disc pattern electrode 13 so that the arrangement of the black "go" stone is selected. On the other hand, when the second lead electrode Wi and the third lead electrode Ci are conducted, the ring pattern electrode 14 related thereto is selected as shown in FIG. 4(B).

The first lead electrode Bi has the connection portion to the disc pattern electrode 13 in such a manner that the connection portion be inside of the checks 12Y etc. This is so that an entirely closed disc pattern is displayed by the disc pattern electrode 13.

Figure 5:
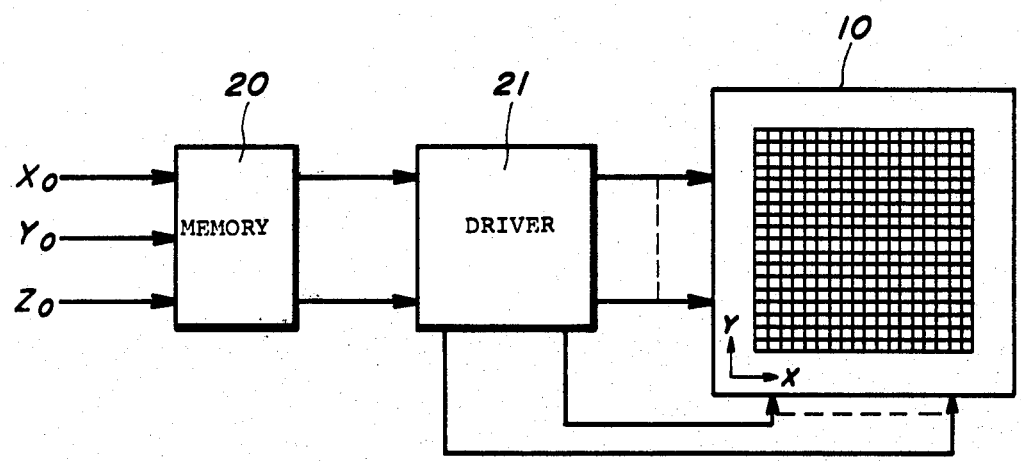
FIG. 5 is a block diagram of a controller of the "go" board shown in FIG. 2.

FIG. 5 shows a controller for the "go" board 10 shown in FIG. 2. The "go" board 10 is illustrated in a manner that the disc pattern electrode 13 and the ring pattern electrode 14 are omitted for sake of convenience only.

The controller comprises a memory 20 and a driver 21. The memory 20 is provided for storing all the positions of the common electrodes 15, the disc pattern electrodes 13, and the ring pattern electrodes 14. The memory 20 receives X0, Y0, and Z0 signals. The X0 signals is adapted to determine the position of the "go" stone in the "go" board 10 along the X-direction. The Y0 signal is adapted to determine the position of the "go" stone along the Y-direction. The Z0 signal is adapted to select the indication of either the black "go" stone or the white "go" stone. The driver 21 is coupled to the memory 20 for conducting the appropriate lead electrodes Bi, Wi, and Ci in accordance with the memory 20. A blank indication is effected where no disc pattern electrodes 13 and ring pattern electrodes 14 are selected.

The present invention can be easily applicable for an electrochromic display for those skilled in the art although the liquid crystal display only has been described above. Outlines of the electrochromic display were disclosed in U.S. Pat. No. 2,319,765 by Talmer, 1943 and U.S. Pat. No. 3,854,794 by H. T. Van Dam et al., 1974, for example.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electro-optical board game display comprising:
   first and second coplanar opposing substrates;
   a pattern of game bord check lines formed on one of said substrates, said pattern being formed by a plurality of vertical lines and a plurality of horizontal lines;
   a plurality of disc pattern electrodes formed on said first substrate, each of said disc pattern electrodes being centered on an intersection of one of said horizontal lines and one of said vertical lines;
   a plurality of ring pattern electrodes formed on said first substrate, each of said ring pattern electrodes being formed concentric to one of said disc pattern electrodes;
   a plurality of common electrodes formed on said second substrate, each of said common electrodes being disc-shaped and positioned directly across from one of said disc pattern electrodes and the ring pattern electrode concentric thereto;
   first lead electrodes connecting horizontal rows of said ring pattern electrodes together to form ring pattern electrode rows; and
   second lead electrodes connecting horizontal rows of said disc pattern electrodes together to form disc pattern electrode rows;

each of said ring pattern electrodes having a discontinuous portion which allows said second lead electrodes to connect to said disc pattern electrodes, said discontinuous portion of each of said ring pattern electrodes being formed in juxtaposition to one of said game board check lines to render the discontinuous portion of each of said ring pattern electrodes hidden from view.

2. The display of claim 1 wherein the portion of each of said second lead electrodes positioned directly across from a common electrode is formed in juxtaposition to one of said game board lines to render that portion of each of said second lead electrodes hidden from view when its associated disc pattern electrode is energized.

3. The display of claim 1 further comprising a layer of liquid crystal composition disposed between said first and second substrates.

4. The display of claim 1 further comprising third lead electrodes connecting vertical rows of said common electrodes to form common electrode columns.

5. The display of claim 1 further comprising:
a plurality of driver means for energizing said ring pattern electrode rows, said disc pattern electrode rows and said common electrode columns to produce a display of desired gamepieces; and
memory means for storing the positions of the desired gamepieces and for energizing the correct driver means in response to a player command to produce a display of desired gamepieces.

* * * * *